United States Patent
Yamashita et al.

(10) Patent No.: US 11,208,548 B2
(45) Date of Patent: Dec. 28, 2021

(54) THERMOPLASTIC RESIN COMPOSITION AND RESIN MOLDED ARTICLE

(71) Applicant: Techno-UMG Co., Ltd., Tokyo (JP)

(72) Inventors: Shinji Yamashita, Ube (JP); Hiroshi Sakai, Ube (JP)

(73) Assignee: TECHNO-UMG CO., LTD., Tokyo (JP)

( * ) Notice: Subject to any disclaimer, the term of this patent is extended or adjusted under 35 U.S.C. 154(b) by 0 days.

(21) Appl. No.: 15/448,727

(22) Filed: Mar. 3, 2017

(65) Prior Publication Data

US 2017/0260381 A1 Sep. 14, 2017

(30) Foreign Application Priority Data

Mar. 10, 2016 (JP) .............................. JP2016-046859

(51) Int. Cl.
| | |
|---|---|
| C08L 25/12 | (2006.01) |
| C08L 55/02 | (2006.01) |
| C08J 7/04 | (2020.01) |
| C08L 51/00 | (2006.01) |
| C08L 51/04 | (2006.01) |
| C08F 279/04 | (2006.01) |

(52) U.S. Cl.
CPC ............... *C08L 25/12* (2013.01); *C08J 7/04* (2013.01); *C08L 51/003* (2013.01); *C08L 51/04* (2013.01); *C08L 55/02* (2013.01); *C08F 279/04* (2013.01); *C08J 2325/12* (2013.01); *C08J 2351/04* (2013.01); *C08L 2205/025* (2013.01); *C08L 2205/03* (2013.01)

(58) Field of Classification Search
CPC .... C08L 2205/05; C08L 55/02; C08L 125/12; C08L 22/16
See application file for complete search history.

(56) References Cited

U.S. PATENT DOCUMENTS

| | | | |
|---|---|---|---|
| 5,955,540 A * | 9/1999 | Dion ..................... | C08F 279/02 525/316 |
| 2004/0006178 A1 | 1/2004 | Nagahara et al. | |
| 2004/0097648 A1 | 5/2004 | Nakai et al. | |
| 2015/0376314 A1 | 12/2015 | Jang et al. | |
| 2015/0376386 A1 | 12/2015 | Kim et al. | |

FOREIGN PATENT DOCUMENTS

| | | |
|---|---|---|
| EP | 0372978 A2 | 6/1990 |
| JP | 45-024151 B | 8/1970 |
| JP | 06-172610 A | 6/1994 |
| JP | H10298371 A | 11/1998 |
| JP | 2000-007877 A | 1/2000 |
| JP | 2000-154291 A | 6/2000 |
| JP | 2000212378 A | 8/2000 |
| JP | 2002-256043 A | 9/2002 |
| JP | 2004-143287 A | 5/2004 |
| JP | 2004-161855 A | 6/2004 |
| JP | 3684744 B | 8/2005 |
| JP | 2005-350566 A | 12/2005 |
| JP | 2006187875 A | 7/2006 |
| JP | 2006265545 A | 10/2006 |
| JP | 2007-023098 A | 2/2007 |
| JP | 2011256366 A | 12/2011 |
| JP | 2012-036384 A | 2/2012 |
| JP | 2013-199520 A | 10/2013 |
| WO | 2015141661 A1 | 9/2015 |

OTHER PUBLICATIONS

Scheirs et al. Modern Styrenic Polymers 2003.*
Notice of Decision to Grant Patent dated Mar. 14, 2017 for Korean Patent Application No. 10-2017-0026945.
Office Action dated May 17, 2016, in Japanese Patent Application No. 2016-046859, and English translation thereof.
Opposition Decision issued Jun. 9, 2017 in Japanese Patent Application No. 2016-046859, and partial translation thereof.
Extended European Search Report dated Aug. 18, 2017 in European Patent Application No. 17158428.7.
Office Action dated Oct. 23, 2017 in Philippines Patent Application No. 1/2017/000048.
Office Action dated Oct. 31, 2018 in Indian Patent Application No. 2017/14005651.

* cited by examiner

*Primary Examiner* — Mark S Kaucher
(74) *Attorney, Agent, or Firm* — Plumsea Law Group, LLC

(57) ABSTRACT

A thermoplastic resin composition containing 25 to 50 parts by mass of a rubber-containing graft copolymer (A) obtained by copolymerizing a monomer mixture containing an aromatic vinyl compound and a vinyl cyanide compound in the presence of a diene-based rubber-like polymer, and 50 to 75 parts by mass of a hard copolymer mixture (B) containing a hard copolymer (B-I) and a hard copolymer (B-II).

12 Claims, No Drawings

THERMOPLASTIC RESIN COMPOSITION AND RESIN MOLDED ARTICLE

Priority is claimed on Japanese Patent Application No. 2016-046859, filed Mar. 10, 2016, the content of which is incorporated herein by reference.

TECHNICAL FIELD

The present invention relates to a thermoplastic resin composition and a resin molded article.

BACKGROUND ART

Molded articles formed from ABS resins have excellent impact resistance, mechanical strength and chemical resistance, and are therefore used in a wide variety of fields including OA (office automation) equipment, information and telecommunication equipment, electronic and electrical equipment, household electrical appliances, automobiles, and construction. For example, in the automobile industry, attention has recently been focused on the superior secondary workability, and particularly the coatability, of ABS resins, leading to the use of ABS resins in automobile exterior coating applications for door mirror components and radiator grills and the like.

However, the coatability is easily affected by factors such as the properties of the resin composition, the molding conditions, the coating material, the coating method and coating environment, meaning coating defects can still occur. The coatability is particularly prone to being affected by the molding conditions. If the molding conditions are unfavorable, then fine unevenness occurs on the coated surface, resulting in the defective phenomenon known as the absorption phenomenon that produces irregularities in the gloss, leading to a marked deterioration in the commercial value of the final product.

In light of these circumstances, a thermoplastic resin composition and a molded article for an automobile that have excellent coatability and good suppression of the absorption phenomenon have been proposed (Patent Document 1).

However, the absorption phenomenon tends to occur readily when production is performed under high-speed molding conditions or when a coating material having powerful attack characteristics is used, and in these cases the resin composition disclosed in Patent Document 1 is unable to satisfactorily suppress the absorption phenomenon. On the other hand, performing production using high-speed molding conditions with a shortened molding cycle for the molded article, thereby enabling greater production efficiency due to the ability to undertake small-lot production of many different items, and using a coating material with powerful attack characteristics in order to improve productivity are both known market demands.

Accordingly, a resin composition that is able to satisfactorily suppress the absorption phenomenon even under these conditions is needed.

BACKGROUND ART LITERATURE

Patent Documents

Patent Document 1: Japanese Unexamined Patent Application, First Publication No. 2000-7877

DISCLOSURE OF INVENTION

Problems to be Solved by the Invention

An object of the present invention is to provide a thermoplastic resin composition which can suppress the occurrence of the absorption phenomenon during coating processes, and has excellent impact resistance and excellent fluidity during molding processing, and also to provide a resin molded article and a coated article obtained by molding this thermoplastic resin composition.

Means for Solving the Problems

As a result of intensive investigation aimed at achieving the above object, the inventors of the present invention discovered that by using a resin composition having a specific composition, a thermoplastic resin composition could be obtained which enables the absorption phenomenon to be suppressed during coating processes for resin molded articles, and also exhibits excellent impact resistance and excellent fluidity during molding processing, and they were therefore able to complete the invention described below.

In other words, the present invention has the aspects described below.

[1] A thermoplastic resin composition containing:

25 to 50 parts by mass of a rubber-containing graft copolymer (A) obtained by copolymerizing a monomer mixture containing an aromatic vinyl compound and a vinyl cyanide compound in the presence of a diene-based rubber-like polymer, and 50 to 75 parts by mass of a hard copolymer mixture (B) containing a hard copolymer (B-I) and a hard copolymer (B-II), wherein the rubber-containing graft copolymer (A) contains a hard copolymer component (A') in which the aromatic vinyl compound and the vinyl cyanide compound are grafted to the diene-based rubber-like polymer, the weight-average molecular weight of the hard copolymer component (A') is from 50,000 to 200,000, the amount of the hard copolymer (B-II) in the hard copolymer mixture (B) is at least 5% by mass but less than 20% by mass, the hard copolymer (B-I) is a polymer containing monomer units derived from the aromatic vinyl compound and monomer units derived from the vinyl cyanide compound, and has a weight-average molecular weight of 50,000 to 150,000, wherein 25 to 32% by mass of the total mass of the hard copolymer (B-I) is composed of monomer units derived from the vinyl cyanide compound, and the hard copolymer (B-II) is a polymer containing monomer units derived from the aromatic vinyl compound and monomer units derived from the vinyl cyanide compound, and has a weight-average molecular weight of 50,000 to 150,000, wherein 35 to 50% by mass of the total mass of the hard copolymer (B-II) is composed of monomer units derived from the vinyl cyanide compound.

[2] The thermoplastic resin composition according to [1], wherein the amount of components derived from the diene-based rubber-like polymer in the rubber-containing graft copolymer (A) is from 35 to 70% by mass.

[3] A resin molded article formed from the thermoplastic resin composition according to [1] or [2].

[4] A coated article formed from the resin molded article according to [3].

Effects of the Invention

According to the present invention, a thermoplastic resin composition which can suppress the occurrence of the absorption phenomenon during coating processes, and also has excellent impact resistance and excellent fluidity during molding processing, and a resin molded article and a coated article obtained by molding this thermoplastic resin composition can be provided.

BEST MODE FOR CARRYING OUT THE INVENTION

Embodiments of the present invention are described below in detail.

The thermoplastic resin composition of the present invention contains a rubber-containing graft copolymer (A) and a hard copolymer mixture (B).

[Rubber-Containing Graft Copolymer (A)]

The rubber-containing graft copolymer (A) according to the present invention is a diene-based rubber-containing graft copolymer obtained by copolymerizing a monomer mixture containing an aromatic vinyl compound and a vinyl cyanide compound in the presence of a diene-based rubber-like polymer. In other words, the rubber-containing graft copolymer (A) of the present invention contains a hard copolymer component (A') in which the aromatic vinyl compound and the vinyl cyanide compound have undergone graft polymerization to the diene-based rubber-like polymer. In addition to the hard copolymer component (A'), the rubber-containing graft copolymer (A) may also contain homopolymers of the aromatic vinyl compound, homopolymers of the vinyl cyanide compound, and copolymers of the aromatic vinyl compound and the vinyl cyanide compound. If necessary, the rubber-containing graft copolymer (A) according to the present invention may also contain components obtained by copolymerizing other copolymerizable compounds in addition to the diene-based rubber-like polymer, the aromatic vinyl compound and the vinyl cyanide compound.

Examples of the diene-based rubber-like polymer used as a raw material for the rubber-containing graft copolymer (A) include polybutadiene, copolymers of a butadiene and a copolymerizable vinyl monomer such as styrene-butadiene and acrylonitrile-butadiene, and polyisoprene. One of these diene-based rubber-like polymers may be used alone, or a combination of two or more types may be used. A polybutadiene is preferred.

The amount of components derived from the diene-based rubber-like polymer in the rubber-containing graft copolymer (A) is preferably from 35 to 70% by mass, and more preferably from 45 to 60% by mass. Provided the amount of these components falls within this range, the resistance to absorption during coating processes, the impact resistance and the fluidity can be further improved.

The resistance to absorption refers to the ability to suppress the occurrence of the absorption phenomenon.

Examples of the aromatic vinyl compound used as a raw material for the rubber-containing graft copolymer (A) include styrene, a-methylstyrene, para-methylstyrene and bromostyrene. One of these aromatic vinyl compounds may be used alone, or a combination of two or more compounds may be used. Among the above compounds, styrene and a-methylstyrene are preferred.

The amount of components derived from the aromatic vinyl compound in the rubber-containing graft copolymer (A) is preferably from 21 to 54% by mass.

Examples of the vinyl cyanide compound used as a raw material for the rubber-containing graft copolymer (A) include acrylonitrile and methacrylonitrile. One of these vinyl cyanide compounds may be used alone, or a combination of two or more compounds may be used. Among the above compounds, acrylonitrile is preferred.

The amount of components derived from the vinyl cyanide compound in the rubber-containing graft copolymer (A) is preferably from 5 to 22% by mass.

Examples of other copolymerizable compounds that can be used as raw materials for the rubber-containing graft copolymer (A) include methacrylate esters and acrylate esters such as methyl methacrylate and methyl acrylate; maleimide compounds such as N-phenylmaleimide and N-cyclohexylmaleimide; and unsaturated carboxylic acids such as acrylic acid, methacrylic acid, itaconic acid and fumaric acid. Any one of these compounds may be used alone, or a combination of two or more compounds may be used.

The amount of components derived from these other copolymerizable compounds in the rubber-containing graft copolymer (A) is preferably from 0 to 10% by mass.

In the rubber-containing graft copolymer (A) according to the present invention, the weight-average molecular weight of the hard copolymer component (A') containing the grafted aromatic vinyl compound and vinyl cyanide compound is from 50,000 to 200,000, and is preferably from 80,000 to 170,000. Provided the weight-average molecular weight of the hard copolymer component (A') falls within this range, the resistance to absorption during coating processes, the impact resistance and the fluidity can be further improved.

The hard copolymer component (A') in the rubber-containing graft copolymer (A) can be extracted, for example, by dissolving the rubber-containing graft copolymer (A) in acetone, collecting the insoluble fraction, and then performing an ozone decomposition treatment.

In the present invention, the weight-average molecular weight describes a value measured using GPC (gel permeation chromatography) and calculated relative to standard polystyrenes.

[Hard Copolymer Mixture (B)]

The hard copolymer mixture (B) according to the present invention contains two types of hard copolymers having specific structures, namely the hard copolymer (B-I) and the hard copolymer (B-II).

The hard copolymer (B-I) and the hard copolymer (B-II) contained in the hard copolymer mixture (B) according to the present invention are polymers obtained by copolymerizing the aromatic vinyl compound, the vinyl cyanide compound, and other copolymerizable compounds that may be used as required. The same compounds as those mentioned above for grafting to the aforementioned diene-based rubber-like polymer can be used for the aromatic vinyl compound, the vinyl cyanide compound and other copolymerizable compounds that may be used as required.

The hard copolymer (B-I) has a weight-average molecular weight of 50,000 to 150,000, and 25 to 35% by mass of the total mass of the copolymer (B-I) is composed of monomer units derived from the vinyl cyanide compound.

The hard copolymer (B-II) has a weight-average molecular weight of 50,000 to 150,000, and 35 to 50% by mass of the total mass of the copolymer (B-II) is composed of monomer units derived from the vinyl cyanide compound.

The amount of the hard copolymer (B-II) within the hard copolymer mixture (B) is from 5 to 25% by mass.

Examples of the aromatic vinyl compound that constitutes the hard copolymer (B-I) include vinyltoluenes such as styrene, α-methylstyrene and p-methylstyrene; halogenated styrenes such as p-chlorostyrene; as well as p-t-butylstyrene, dimethylstyrene and vinylnaphthalenes. One of these aromatic vinyl compounds may be used alone, or a combination of two or more compounds may be used. Among the above compounds, styrene and a-methylstyrene are preferred. It is preferable that the aromatic vinyl compound that constitutes the hard copolymer (B-I) is the same as the preferred aromatic vinyl compound that constitutes the hard copolymer (B-II).

Examples of the vinyl cyanide compound include acrylonitrile and methacrylonitrile. Of these, acrylonitrile is preferred. It is preferable that the vinyl cyanide compound that constitutes the hard copolymer (B-I) is the same as the preferred vinyl cyanide compound that constitutes the hard copolymer (B-II).

The weight-average molecular weights of the hard copolymer (B-I) and the hard copolymer (B-II) are each within a range from 50,000 to 150,000, and preferably within a range from 70,000 to 130,000. Provided the weight-average molecular weights of the hard copolymer (B-I) and the hard copolymer (B-II) fall within this range, the resistance to absorption during coating processes, the impact resistance and the fluidity can be further improved.

The amount of monomer units derived from the vinyl cyanide compound in the hard copolymer (B-I) is from 25 to 35% by mass, preferably within a range from 25 to 32% by mass, and more preferably within a range from 28 to 32% by mass. Provided the amount of the vinyl cyanide compound in the hard copolymer (B-I) falls within this range, the resistance to absorption during coating processes, the impact resistance and the fluidity are able to manifest more effectively.

The amount of monomer units derived from the vinyl cyanide compound in the hard copolymer (B-II) is from 35 to 50% by mass, and preferably within a range from 40 to 45% by mass. Provided the amount of the vinyl cyanide compound in the hard copolymer (B-II) falls within this range, the resistance to absorption during coating processes, the impact resistance and the fluidity are able to manifest more effectively.

The amount of the hard copolymer (B-II) in the hard copolymer mixture (B) is from 5 to 25% by mass, preferably at least 5% by mass but less than 20% by mass, and more preferably at least 10% by mass but less than 20% by mass. Provided the amount of the hard copolymer (B-II) in the hard copolymer mixture (B) falls within this range, the resistance to absorption during coating processes, the impact resistance and the fluidity are able to manifest more effectively.

Any conventional polymerization method such as an emulsion polymerization, suspension polymerization, bulk polymerization, or a combination thereof may be used as the method for producing the hard copolymer (B-I) and the hard copolymer (B-II).

[Other Components]

The thermoplastic resin composition of the present invention may also contain any of various additives and other resins as optional components. Examples of these various additives include known antioxidants, light stabilizers, ultraviolet absorbers, lubricants, plasticizers, stabilizers, transesterification inhibitors, hydrolysis inhibitors, release agents, antistatic agents, colorants (such as pigments and dyes), fillers such as carbon fiber, glass fiber, wollastonite, calcium carbonate, silica and talc, flame retardants such as bromine-based flame retardants and phosphorus-based flame retardants, flame retardant auxiliaries such as antimony trioxide, anti-dripping agents such as fluororesins, antibacterial agents, antifungal agents, silicone oils and coupling agents, which may be used alone or in combinations containing two or more additives.

Further, examples of other resins include rubber-reinforced styrene-based resins such as HIPS resins, ABS resins, ASA resins and AES resins, as well as AS resins, polystyrene resins, nylon resins, methacrylic resins, polyvinyl chloride resins, polybutylene terephthalate resins, polyethylene terephthalate resins and polyphenylene ether resins. Blends of two or more of these resins may also be used, and any of the above resins that have been modified with a compatibilizer or functional group may also be added.

Items recovered from polymerization processes, manufacturing processes or molding processes, or recycled items recovered from the marketplace can also be used as any of the essential components or optional components used in the present invention, provided they do not cause quality issues.

[Production and Molding of Thermoplastic Resin Composition]

The thermoplastic resin composition of the present invention is produced by mixing and kneading the rubber-containing graft copolymer (A), the hard copolymer mixture (B), and any other optional components that are used according to need. The thermoplastic resin composition of the present invention is used as a molding material for forming resin molded articles. There are no particular limitations on the method used for mixing and kneading the various components of the thermoplastic resin composition, and any typical mixing and kneading method may be employed, including a method in which kneading is performed using an extruder, Banbury mixer or kneading roll or the like, and a pelletizer or the like is then used to cut and pelletize the kneaded product.

[Resin Molded Article]

The resin molded article of the present invention is molded from the aforementioned thermoplastic resin composition of the present invention, and there are no limitations on the molding method. Examples of the molding method include injection molding methods, extrusion molding methods, compression molding methods, insert molding methods, vacuum molding methods and blow molding methods.

The resin molded article of the present invention, obtained by molding the thermoplastic resin composition of the present invention, exhibits excellent resistance to absorption during coating processes, excellent impact resistance and superior fluidity.

This type of resin molded article of the present invention can be used favorably for a wide variety of applications, including OA (office automation) equipment, information and telecommunication equipment, electronic and electrical equipment, household electrical appliances, automobiles, and construction.

[Coated Article]

The coated article of the present invention is obtained by coating the aforementioned resin molded article of the present invention, and there are no limitations on the coating method used. Examples of the coating method include methods using all manner of coating machines, methods that use spraying, and brush coating methods. Conventional coating materials such as urethane-based coating materials, acrylic-based coating materials and silicone-based coating materials can be used as the coating material used in the coating process.

The coated article of the present invention obtained by coating the resin molded article of the present invention exhibits excellent resistance to absorption during coating processes, excellent impact resistance and superior fluidity.

This type of coated article of the present invention can be used favorably for a wide variety of applications, including OA (office automation) equipment, information and telecommunication equipment, electronic and electrical equipment, household electrical appliances, automobiles, and construction.

Examples

The present invention is described below in more detail using a series of synthesis examples, examples and comparative examples, but the scope of the present invention is in no way limited by the following examples.

In the following description, "parts" means "parts by mass".

<Weight-Average Molecular Weight (Mw) of Rubber-Containing Graft Copolymer>

The rubber-containing graft copolymer (A) was dissolved in acetone, and the insoluble fraction was collected and subjected to an ozone decomposition treatment to extract the hard copolymer component (A'). Using a solution obtained by dissolving this hard copolymer component (A') in tetrahydrofuran as a measurement sample, a measurement was performed using GPC (gel permeation chromatography) (manufactured by Tosoh Corporation), and the Mw value was calculated relative to standard polystyrenes.

<Compositional Ratio Between Hard Copolymer (B-I) and Hard Copolymer (B-II)>

The compositional ratio between the hard copolymer (B-I) and the hard copolymer (B-II) was determined by quantifying the amounts of residual monomers following completion of the reaction using a Shimadzu Corporation GC-2014 apparatus, and then back-calculating the fixed quantity from these residual monomer values.

<Weight-Average Molecular Weights (Mw) of Hard Copolymers (B-I) and (B-II)>

Using solutions obtained by dissolving each of the hard copolymers (B-I) and (B-II) in tetrahydrofuran as measurement samples, measurements were performed using GPC (gel permeation chromatography) (manufactured by Tosoh Corporation), and the Mw values were calculated relative to standard polystyrenes.

Synthesis Example 1: Rubber-Containing Graft Copolymer (A-1)

A reactor was charged with 175 parts of water, 0.3 parts of beef tallow fatty acid potassium salt, 0.054 parts of potassium hydroxide and 52 parts of a polybutadiene latex, and the mixture was heated to 60° C. Subsequently, 0.003 parts of ferrous sulfate, 0.075 parts of sodium pyrophosphate and 0.173 parts of crystalline glucose were added, and with the temperature held at 60° C., 36.5 parts of styrene, 11.5 parts of acrylonitrile, 0.08 parts of t-dodecylmercaptan and 0.25 parts of cumene hydroperoxide were added in a continuous manner over a period of 2 hours. The temperature was then raised to 70° C. and held at that temperature for one hour to complete the reaction. An antioxidant was added to the latex obtained following completion of the reaction, the latex was then solidified by adding sulfuric acid, and the resulting solid was washed thoroughly with water and dried to obtain a rubber-containing graft copolymer (A-1). The weight-average molecular weight of the hard copolymer component (Ar-1) within the obtained rubber-containing graft copolymer (A-1) was 105,000.

Synthesis Example 2: Rubber-Containing Graft Copolymer (A-2)

With the exceptions of altering the amount of the polybutadiene latex to 35 parts, the amount of styrene to 49 parts and the amount of acrylonitrile to 16 parts, polymerization was performed in the same manner as Synthesis Example 1, yielding a rubber-containing graft copolymer (A-2). The weight-average molecular weight of the hard copolymer component (A-2) within the obtained rubber-containing graft copolymer (A-2) was 120,000.

Synthesis Example 3: Rubber-Containing Graft Copolymer (A-3)

With the exceptions of altering the amount of the polybutadiene latex to 70 parts, the amount of styrene to 23 parts and the amount of acrylonitrile to 7 parts, polymerization was performed in the same manner as Synthesis Example 1, yielding a rubber-containing graft copolymer (A-3). The weight-average molecular weight of the hard copolymer component (N-3) within the obtained rubber-containing graft copolymer (A-3) was 125,000.

Synthesis Example 4: Rubber-Containing Graft Copolymer (A-4), Comparative Item

With the exception of altering the amount of t-dodecylmercaptan to 0.15 parts, polymerization was performed in the same manner as Synthesis Example 1, yielding a rubber-containing graft copolymer (A-4). The weight-average molecular weight of the hard copolymer component (A'-4) within the obtained rubber-containing graft copolymer (A-4) was 45,000, which is outside the range of the present invention.

Synthesis Example 5: Rubber-Containing Graft Copolymer (A-5), Comparative Item

With the exception of altering the amount of t-dodecylmercaptan to 0.04 parts, polymerization was performed in the same manner as Synthesis Example 1, yielding a rubber-containing graft copolymer (A-5). The weight-average molecular weight of the hard copolymer component (A'-5) within the obtained rubber-containing graft copolymer (A-5) was 250,000, which is outside the range of the present invention.

Synthesis Example 6: Hard Copolymer (B-I-1)

A reactor was charged with a monomer mixture composed of 125 parts of water, 0.4 parts of calcium phosphate, 0.0025 parts of potassium alkenylsuccinate, 0.04 parts of 1,1,3,3-tetramethylbutylperoxy-2-ethylhexanoate, 0.06 parts of 1,1-di(t-hexylperoxy)cyclohexane, 0.03 parts of t-butylperoxy-2-ethylhexyl carbonate, 0.5 parts of t-dodecylmercaptan, 68 parts of styrene and 32 parts of acrylonitrile, and the mixture was reacted. The reaction was performed by raising the temperature from an initial temperature of 65° C. to a temperature of 125° C. over a period of 6.5 hours, while sequentially adding portions of the water, the acrylonitrile and the styrene. Following reaction at 125° C. for an additional one hour, the polymer product was removed, yielding a hard copolymer (B-I-1). The compositional ratio of the obtained hard copolymer (B-I-1) is shown in Table 1. The weight-average molecular weight of the hard copolymer (B-I-1) was 90,000, and the amount of monomer units derived from the vinyl cyanide compound was 32.0% by mass.

Synthesis Example 7: Hard Copolymer (B-I-2), Comparative Item

With the exception of altering the amount of t-dodecylmercaptan to 0.8 parts, polymerization was performed in the same manner as Synthesis Example 6, yielding a hard copolymer (B-I-2). The compositional ratio of the obtained hard copolymer (B-I-2) is shown in Table 1. The weight-average molecular weight of the hard copolymer (B-I-2) was 47,000, which is outside the range of the present invention, and the amount of monomer units derived from the vinyl cyanide compound was 31.6% by mass.

Synthesis Example 8: Hard Copolymer (B-I-3), Comparative Item

With the exception of altering the amount of t-dodecylmercaptan to 0.2 parts, polymerization was performed in the same manner as Synthesis Example 6, yielding a hard copolymer (B-I-3). The compositional ratio of the obtained hard copolymer (B-I-3) is shown in Table 1. The weight-average molecular weight of the hard copolymer (B-I-3) was 215,000, which is outside the range of the present invention, and the amount of monomer units derived from the vinyl cyanide compound was 31.8% by mass.

Synthesis Example 9: Hard Copolymer (B-I-4), Comparative Item

With the exceptions of altering the amount of styrene to 77 parts and the amount of acrylonitrile to 23 parts, polymerization was performed in the same manner as Synthesis Example 6, yielding a hard copolymer (B-I-4). The compositional ratio of the obtained hard copolymer (B-I-4) is shown in Table 1. The weight-average molecular weight of the hard copolymer (B-I-4) was 120,000, but the amount of monomer units derived from the vinyl cyanide compound was 23.0% by mass, which is outside the range of the present invention.

Synthesis Example 10: Hard Copolymer (B-I-5), Comparative Item

With the exceptions of altering the amount of styrene to 63 parts and the amount of acrylonitrile to 37 parts, polymerization was performed in the same manner as Synthesis Example 6, yielding a hard copolymer (B-I-5). The compositional ratio of the obtained hard copolymer (B-I-5) is shown in Table 1. The weight-average molecular weight of the hard copolymer (B-I-5) was 105,000, but the amount of monomer units derived from the vinyl cyanide compound was 37.0% by mass, which is outside the range of the present invention.

Synthesis Example 11: Hard Copolymer (B-II-1)

With the exceptions of altering the amount of styrene to 57 parts, the amount of acrylonitrile to 43 parts, and the amount of t-dodecylmercaptan to 0.45 parts, polymerization was performed in the same manner as Synthesis Example 6, yielding a hard copolymer (B-II-1). The compositional ratio of the obtained hard copolymer (B-II-1) is shown in Table 1. The weight-average molecular weight of the hard copolymer (B-II-1) was 114,000, and the amount of monomer units derived from the vinyl cyanide compound was 43.0% by mass.

Synthesis Example 12: Hard Copolymer (B-II-2), Comparative Item

With the exceptions of altering the amount of styrene to 57 parts, the amount of acrylonitrile to 43 parts, and the amount of t-dodecylmercaptan to 0.9 parts, polymerization was performed in the same manner as Synthesis Example 6, yielding a hard copolymer (B-II-2). The compositional ratio of the obtained hard copolymer (B-II-2) is shown in Table 1. The weight-average molecular weight of the hard copolymer (B-II-2) was 45,000, which is outside the range of the present invention, and the amount of monomer units derived from the vinyl cyanide compound was 42.4% by mass.

Synthesis Example 13: Hard Copolymer (B-II-3), Comparative Item

With the exceptions of altering the amount of styrene to 57 parts, the amount of acrylonitrile to 43 parts, and the amount of t-dodecylmercaptan to 0.15 parts, polymerization was performed in the same manner as Synthesis Example 6, yielding a hard copolymer (B-II-3). The compositional ratio of the obtained hard copolymer (B-II-3) is shown in Table 1. The weight-average molecular weight of the hard copolymer (B-II-3) was 220,000, which is outside the range of the present invention, and the amount of monomer units derived from the vinyl cyanide compound was 43.2% by mass.

Synthesis Example 14: Hard Copolymer (B-II-4), Comparative Item

With the exceptions of altering the amount of styrene to 66 parts, the amount of acrylonitrile to 34 parts, and the amount of t-dodecylmercaptan to 0.4 parts, polymerization was performed in the same manner as Synthesis Example 6, yielding a hard copolymer (B-II-4). The compositional ratio of the obtained hard copolymer (B-II-4) is shown in Table 1. The weight-average molecular weight of the hard copolymer (B-II-4) was 120,000, but the amount of monomer units derived from the vinyl cyanide compound was 34.5% by mass, which is outside the range of the present invention.

Synthesis Example 15: Hard Copolymer (B-II-5), Comparative Item

With the exceptions of altering the amount of styrene to 48 parts, the amount of acrylonitrile to 52 parts, and the amount of t-dodecylmercaptan to 0.4 parts, polymerization was performed in the same manner as Synthesis Example 6, yielding a hard copolymer (B-II-5). The compositional ratio of the obtained hard copolymer (B-II-5) is shown in Table 1. The weight-average molecular weight of the hard copolymer (B-II-5) was 110,000, but the amount of monomer units derived from the vinyl cyanide compound was 50.2% by mass, which is outside the range of the present invention.

TABLE 1

| | Compositional ratio | |
|---|---|---|
| | Vinyl cyanide compound | Aromatic vinyl compound |
| B-I-1 | 32.0 | 68.0 |
| B-I-2 (comparative item) | 31.6 | 68.4 |
| B-I-3 (comparative item) | 31.8 | 68.2 |
| B-I-4 (comparative item) | 23.0 | 77.0 |
| B-I-5 (comparative item) | 37.0 | 63.0 |
| B-II-1 | 43.0 | 57.0 |
| B-II-2 (comparative item) | 42.4 | 57.6 |
| B-II-3 (comparative item) | 43.2 | 56.8 |
| B-II-4 (comparative item) | 34.5 | 65.5 |
| B-II-5 (comparative item) | 50.2 | 49.8 |

Examples 1 to 7, and Comparative Examples 1 to 12

<Production of Thermoplastic Resin Compositions>

The rubber-containing graft copolymer (A), the hard copolymer (B-I) and the hard copolymer (B-II) were mixed in the ratios shown in Table 2 and Table 3 to prepare a series of thermoplastic resin compositions.

The thermoplastic resin compositions of Examples 1 to 7 and the thermoplastic resin compositions of Comparative Examples 1 to 12 were each subjected to melt kneading at a temperature of 200° C. using a 30 mm twin screw extruder (TEX30α manufactured by The Japan Steel Works, Ltd.) and then pelletized, thus obtaining pellets of each of the thermoplastic resin compositions of Examples 1 to 7 and pellets of each of the thermoplastic resin compositions of Comparative Examples 1 to 12.

<Evaluation of Coatability (Absorption)>

The pellets of the thermoplastic resin compositions of Examples 1 to 7 and the pellets of the thermoplastic resin compositions of Comparative Examples 1 to 12 were each subjected to injection molding using an 85-ton injection molding machine (J85AD-110H manufactured by The Japan Steel Works, Ltd.). The injection molding was performed using a coatability evaluation mold (length: 200 mm×8 width: 60 mm×8 thickness: 3 mm), under conditions including a cylinder temperature of 180° C., a mold temperature of 30° C., and an injection rate of low (10 mm/sec), medium (25 mm/sec) or high (50 mm/sec).

Each of the obtained test pieces was spray coated with a urethane-based coating material, the degree of the absorption phenomenon that occurred in the molded article was observed visually, and the coatability (absorption) was evaluated against the following criteria. The results are shown in Table 2 and Table 3.

A: absolutely no unevenness on the molded article surface, excellent coatability B: some partial unevenness on the molded article surface, but of no problem in terms of practical application C: unevenness across the entire molded article surface, not of a level suitable for practical application <Evaluation of Charpy Impact Strength>

The pellets of the thermoplastic resin compositions of Examples 1 to 7 and the pellets of the thermoplastic resin compositions of Comparative Examples 1 to 12 were each subjected to injection molding using an 75-ton injection molding machine (J75EII-P manufactured by The Japan Steel Works, Ltd.). The injection molding was performed under conditions including a cylinder temperature of 235° C. and a mold temperature of 60° C., thus forming test pieces (length: 80 mm×8 width: 10 mm×8 thickness: 4 mm) from each of the thermoplastic resin compositions.

Using each of the obtained test pieces, the Charpy impact strength was measured using the method described below. The results are shown in Table 2 and Table 3.

The Charpy impact strength was measured in accordance with ISO 179 at a measurement temperature of 23° C., and was then evaluated against the following criteria.

A: Charpy impact strength of 25 kJ/m$^2$ or higher, excellent impact strength

B: Charpy impact strength of at least 20 kJ/m$^2$ but less than 25 kJ/m$^2$, no problem in terms of practical application C: Charpy impact strength less than 20 kJ/m$^2$, not of a level suitable for practical application <Evaluation of Fluidity (Spiral Flow)>

Using a spiral flow mold (width: 15 mm×8 thickness: 2 mm) under conditions including a cylinder temperature of 270° C., a mold temperature of 60° C. and an injection pressure of 100 MPa, the pellets of the thermoplastic resin compositions of Examples 1 to 7 and the pellets of the thermoplastic resin compositions of Comparative Examples 1 to 12 were each subjected to injection molding from an 85-ton injection molding machine (J85AD-110H manufactured by The Japan Steel Works, Ltd.). The spiral flow length (mm) of each of the obtained molded articles was measured, and the fluidity (spiral flow) was evaluated against the following criteria. The results are shown in Table 2 and Table 3.

A: spiral flow length of at least 410 mm, materialistically excellent

B: spiral flow length of at least 380 mm but less than 410 mm, no problem in terms of practical application C: spiral flow length of less than 380 mm, not of a level suitable for practical application <Overall Evaluation>

Based on the above evaluations results, thermoplastic resin compositions for which the above evaluations for coatability (absorption), Charpy impact strength and fluidity (spiral flow) were all "A" were awarded an overall evaluation of "AA". Compositions for which all of the evaluation results were either "A" or "B", and for which at least three "A" evaluation results were obtained were awarded an overall evaluation of "A". Further, compositions for which all of the evaluation results were either "A" or "B", but for which the number of "A" evaluation results was 2 or less were awarded an overall evaluation of "B". Compositions which were evaluated as "C" for even one evaluation were awarded an overall evaluation of "C". The results are shown in Table 2 and Table 3.

TABLE 2

| | | Name | Molecular weight | Example 1 | Example 2 | Example 3 | Example 4 | Example 5 | Example 6 | Example 7 |
|---|---|---|---|---|---|---|---|---|---|---|
| Thermoplastic resin composition | Rubber-containing graft copolymer (A) (parts by mass) | A-1 | 105,000 | 35 | 25 | 50 | 30 | 30 | — | — |
| | | A-2 | 120,000 | — | — | — | — | — | 35 | — |
| | | A-3 | 125,000 | — | — | — | — | — | — | 35 |

TABLE 2-continued

| | | Name | Molecular weight | Example 1 | Example 2 | Example 3 | Example 4 | Example 5 | Example 6 | Example 7 |
|---|---|---|---|---|---|---|---|---|---|---|
| formulation | | A-4 (comparative item) | 45,000 | — | — | — | — | — | — | — |
| | | A-5 (comparative item) | 250,000 | — | — | — | — | — | — | — |
| Hard copolymer mixture (B) (parts by mass) | Hard copolymer (B-I) | B-I-1 | 90,000 | 55 | 63 | 42 | 65 | 56 | 55 | 55 |
| | | B-I-2 (comparative item) | 47,000 | — | — | — | — | — | — | — |
| | | B-I-3 (comparative item) | 215,000 | — | — | — | — | — | — | — |
| | | B-I-4 (comparative item) | 120,000 | — | — | — | — | — | — | — |
| | | B-I-5 (comparative item) | 105,000 | — | — | — | — | — | — | — |
| | Hard copolymer (B-II) | B-II-1 | 114,000 | 10 | 12 | 8 | 5 | 14 | 10 | 10 |
| | | B-II-2 (comparative item) | 45,000 | — | — | — | — | — | — | — |
| | | B-II-3 (comparative item) | 220,000 | — | — | — | — | — | — | — |
| | | B-II-4 (comparative item) | 120,000 | — | — | — | — | — | — | — |
| | | B-II-5 (comparative item) | 110,000 | — | — | — | — | — | — | — |
| | | Total of (B-I) and (B-II) | | 65 | 75 | 50 | 70 | 70 | 65 | 65 |
| | | Amount of (B-II) within (B) (% by mass) | | 15.4 | 16.0 | 16.0 | 7.1 | 20.0 | 15.4 | 15.4 |
| Evaluation results | Coatability (absorption) | low rate | | A | A | A | A | A | A | A |
| | | medium rate | | A | A | A | A | A | A | A |
| | | high rate | | A | A | A | A | A | A | A |
| | | Charpy impact strength (kJ/m$^2$) | | 31 | 25 | 36 | 31 | 27 | 20 | 38 |
| | | | | A | A | A | A | A | B | A |
| | | Fluidity (spiral flow) (mm) | | 430 | 460 | 410 | 435 | 420 | 410 | 382 |
| | | | | A | A | A | A | A | A | B |
| | | Overall evaluation | | AA | AA | AA | AA | AA | A | A |

TABLE 3

| | | Name | Molecular weight | Comparative Example 1 | Comparative Example 2 | Comparative Example 3 | Comparative Example 4 | Comparative Example 5 | Comparative Example 6 |
|---|---|---|---|---|---|---|---|---|---|
| Thermoplastic resin composition formulation | Rubber-containing graft copolymer (A) (parts by mass) | A-1 | 105,000 | — | — | 35 | 35 | 35 | 35 |
| | | A-2 | 120,000 | — | — | — | — | — | — |
| | | A-3 | 125,000 | — | — | — | — | — | — |
| | | A-4 (comparative item) | 45,000 | 35 | — | — | — | — | — |
| | | A-5 (comparative item) | 250,000 | — | 35 | — | — | — | — |
| Hard copolymer mixture (B) (parts by mass) | Hard copolymer (B-I) | B-I-1 | 90,000 | 55 | 55 | 47 | 62 | — | — |
| | | B-I-2 (comparative item) | 47,000 | — | — | — | — | — | — |
| | | B-I-3 (comparative item) | 215,000 | — | — | — | — | — | — |
| | | B-I-4 (comparative item) | 120,000 | — | — | — | — | — | — |
| | | B-I-5 (comparative item) | 105,000 | — | — | — | — | 55 | — |
| | | | | | | | | | 55 |
| | Hard copolymer (B-II) | B-II-1 | 114,000 | 10 | 10 | 18 | 3 | 10 | 10 |
| | | B-II-2 (comparative item) | 45,000 | — | — | — | — | — | — |
| | | B-II-3 (comparative item) | 220,000 | — | — | — | — | — | — |
| | | B-II-4 (comparative item) | 120,000 | — | — | — | — | — | — |
| | | B-II-5 (comparative item) | 110,000 | — | — | — | — | — | — |
| | | Total of (B-I) and (B-II) | | 65 | 65 | 65 | 65 | 65 | 65 |
| | | Amount of (B-II) within (B) (% by mass) | | 15.4 | 15.4 | 27.7 | 4.6 | 15.4 | 15.4 |
| Evaluation results | Coatability (absorption) | low rate | | A | A | A | C | A | A |
| | | medium rate | | A | A | A | C | A | A |
| | | high rate | | A | C | A | C | A | C |
| | | Charpy impact strength (kJ/m$^2$) | | 17 | 33 | 19 | 32 | 16 | 31 |
| | | | | C | A | C | A | C | A |
| | | Fluidity (spiral flow) (mm) | | 445 | 372 | 425 | 445 | 470 | 350 |
| | | | | A | C | A | A | A | C |
| | | Overall evaluation | | C | C | C | C | C | C |

| | | Name | Molecular weight | Comparative Example 7 | Comparative Example 8 | Comparative Example 9 | Comparative Example 10 | Comparative Example 11 | Comparative Example 12 |
|---|---|---|---|---|---|---|---|---|---|
| Thermoplastic resin composition formulation | Rubber-containing graft copolymer (A) (parts by mass) | A-1 | 105,000 | 35 | 35 | 35 | 35 | 35 | 35 |
| | | A-2 | 120,000 | — | — | — | — | — | — |
| | | A-3 | 125,000 | — | — | — | — | — | — |
| | | A-4 (comparative item) | 45,000 | — | — | — | — | — | — |
| | | A-5 (comparative item) | 250,000 | — | — | — | — | — | — |
| Hard copolymer mixture (B) (parts by mass) | Hard copolymer (B-I) | B-I-1 | 90,000 | — | — | 55 | 55 | 55 | 55 |
| | | B-I-2 (comparative item) | 47,000 | — | — | — | — | — | — |
| | | B-I-3 (comparative item) | 215,000 | — | — | — | — | — | — |
| | | B-I-4 (comparative item) | 120,000 | 55 | — | — | — | — | — |
| | | B-I-5 (comparative item) | 105,000 | — | 55 | — | — | — | — |
| | Hard copolymer | B-II-1 | 114,000 | 10 | 10 | — | — | — | — |
| | | B-II-2 (comparative item) | 45,000 | — | — | 10 | — | — | — |

TABLE 3-continued

|  |  |  |  |  |  |  |  |  |  |
|---|---|---|---|---|---|---|---|---|---|
| | (B-II) | B-II-3 (comparative item) | 220,000 | — | — | — | 10 | — | — |
| | | B-II-4 (comparative item) | 120,000 | — | — | — | — | 10 | — |
| | | B-II-5 (comparative item) | 110,000 | — | — | — | — | — | 10 |
| | | Total of (B-I) and (B-II) | | 65 | 65 | 65 | 65 | 65 | 65 |
| | | Amount of (B-II) within (B) (% by mass) | | 15.4 | 15.4 | 15.4 | 15.4 | 15.4 | 15.4 |
| Evaluation results | Coatability (absorption) | low rate | | C | A | A | A | C | A |
| | | medium rate | | C | A | A | A | C | A |
| | | high rate | | C | A | A | A | C | A |
| | | Charpy impact strength (kJ/m$^2$) | | 32 | 15 | 18 | 30 | 29 | 12 |
| | | | | A | C | C | A | A | C |
| | | Fluidity (spiral flow) (mm) | | 410 | 415 | 450 | 375 | 447 | 402 |
| | | | | A | A | A | C | A | B |
| | | Overall evaluation | | C | C | C | C | C | C |

Based on Table 2 and Table 3, it is evident that thermoplastic resin compositions containing the rubber-containing graft copolymer (A) and the hard copolymer mixture (B) in amounts within the prescribed ranges can form resin molded articles that exhibit excellent resistance to absorption during coating processes, excellent impact resistance and superior fluidity during molding processing.

INDUSTRIAL APPLICABILITY

The present invention is able to provide a thermoplastic resin composition which can suppress the occurrence of the absorption phenomenon during coating processes, and has excellent impact resistance and excellent fluidity during molding processing, and can also provide a resin molded article and a coated article obtained by molding this thermoplastic resin composition. As a result, the present invention is extremely useful industrially.

The invention claimed is:

1. A thermoplastic resin composition comprising:
   25 to 50 parts by mass of a rubber-containing graft copolymer (A) obtained by copolymerizing a monomer mixture comprising an aromatic vinyl compound and a vinyl cyanide compound in presence of a diene-based rubber-like polymer, and
   50 to 75 parts by mass of a hard copolymer mixture (B) comprising a hard copolymer (B-I) and a hard copolymer (B-II), wherein
   the rubber-containing graft copolymer (A) comprises a hard copolymer component (A') in which the aromatic vinyl compound and the vinyl cyanide compound are grafted to the diene-based rubber-like polymer,
   a weight-average molecular weight of the hard copolymer component (A') is from 50,000 to 200,000,
   an amount of the hard copolymer (B-II) in the hard copolymer mixture (B) is at least 5% by mass but less than 20% by mass,
   the hard copolymer (B-I) is a polymer comprising monomer units derived from the aromatic vinyl compound and monomer units derived from the vinyl cyanide compound, and has a weight-average molecular weight of 50,000 to 150,000, wherein 25 to 32% by mass of a total mass of the hard copolymer (B-I) is composed of monomer units derived from the vinyl cyanide compound, and
   the hard copolymer (B-II) is a polymer comprising monomer units derived from the aromatic vinyl compound and monomer units derived from the vinyl cyanide compound, and has a weight-average molecular weight of 50,000 to 150,000, wherein more than 40% by mass to 50% by mass of a total mass of the hard copolymer (B-II) is composed of monomer units derived from the vinyl cyanide compound.

2. The thermoplastic resin composition according to claim 1, wherein an amount of components derived from the diene-based rubber-like polymer in the rubber-containing graft copolymer (A) is from 35 to 70% by mass.

3. A resin molded article formed from the thermoplastic resin composition according to claim 1.

4. A resin molded article formed from the thermoplastic resin composition according to claim 2.

5. A coated article formed from the resin molded article according to claim 3.

6. A coated article formed from the resin molded article according to claim 4.

7. The thermoplastic resin composition according to claim 1, wherein 43 to 50 percent by mass of the hard copolymer (B-II) is composed of monomer units derived from the vinyl cyanide compound.

8. The thermoplastic resin composition according to claim 1, wherein the thermoplastic resin composition suppresses the adsorption phenomenon when injected molded at any speed.

9. The thermoplastic resin composition according to claim 1, wherein the thermoplastic resin suppresses the adsorption phenomenon when processed at an injection speed at least about double the injection speed of a resin having of a total mass of a reference resin similar to the hard copolymer (B-II) but composed of less than 40 weight percent monomer units derived from the vinyl cyanide compound.

10. The coated resin molded article according to claim 5 exhibiting no unevenness.

11. The coated resin molded article according to claim 10, wherein the coating has powerful attack characteristics.

12. The coated resin molded article according to claim 5 exhibiting no unevenness when formed at a speed at least about at an injection speed at least about double the injection speed of a resin having of a total mass of a reference resin similar to the hard copolymer (B-II) but composed of less than 40 weight percent monomer units derived from the vinyl cyanide compound.

* * * * *